United States Patent Office 3,289,984
Patented Dec. 6, 1966

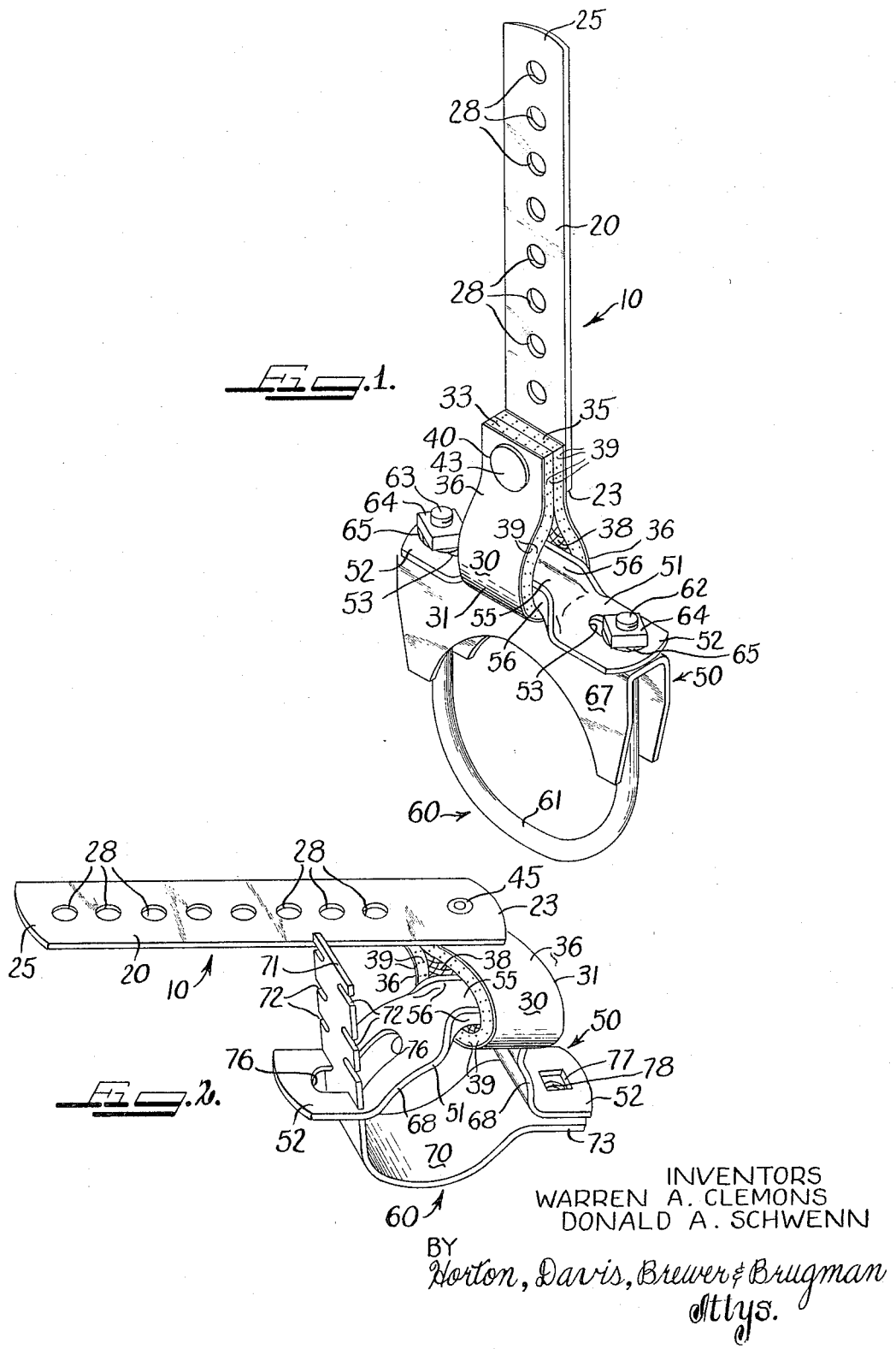

1

3,289,984
AUTOMOTIVE EXHAUST PIPE SUPPORT
Warren A. Clemons and Donald A. Schwenn, Columbia City, Ind., assignors to Viking Auto Products, Inc., Columbia City, Ind., a corporation of Indiana
Filed Mar. 11, 1966, Ser. No. 533,599
8 Claims. (Cl. 248—60)

This invention relates in general to pipe supports, and in particular, to an improved support for an automotive exhaust pipe.

The components of an automotive exhaust system, such as the muffler and exhaust pipes, are ordinarily secured to a vehicle under-frame by means of various straps, brackets, clamps, and the like. A T-shaped bracket has achieved wide-spread acceptance as a universal exhaust pipe support, since it may be placed and bent to assume various support dispositions pending from a vehicle under-frame. Fabrication of the prior art brackets, in general, has proven to be quite feasible and practical, with the exception, however, that a plurality of fasteners, such as rivets, spot-welds, or the like, are required at the T-junction. This requirement has appreciably increased the difficulties and expense of manufacture. Furthermore, it has been noted that stresses tend to be concentrated at any bends and at the T-junction, thus creating weak spots thereat. It is easily appreciated that vibrations, which are present in considerable strength along an exhaust pipe, are transmitted to the bracket weak spots and cause a fatigue deterioration and ultimate failure. It would clearly be beneficial to eliminate the transmittal of vibration to the bracket for a prolonged life thereof, and also to eliminate the transmittal of vibrations in the form of noise to the vehicle frame. Finally, chemical deterioration due to an exposure to the elements, additionally shortens useful life, and any heat transmitted from the exhaust pipe can be expected to accelerate such chemical deterioration.

Therefore, to overcome the foregoing and other difficulties of the prior art, the general object of this invention is to provide a new and improved exhaust pipe support which has a long, useful life.

One of the objects of this invention is to insulate an exhaust pipe support from the vibrations, noise and heat present in an exhaust pipe.

Another object of this invention is to provide a novel pipe support which employs but a single fastener in the fabrication thereof.

A further object of this invention is the provision of a new and improved pipe support which is adjustable and adaptable to various dispositions for a truly universal utilization thereof.

It is an object of this invention to provide for quiet and secure exhaust systems in a vehicle.

It is still another object to provide a durable exhaust pipe support which is economical to product by utilizing a minimum of conventional, currently available materials and components that lend themselves to standard mass production manufacturing techniques.

Further and other objects, and a more complete understanding of the invention may be had by referring to the following description and claims, taken in conjunction with the accompanying drawings in which:

FIG. 1 is a perspective view of the invented pipe support illustrating a particular pipe clamp and disposition thereof.

FIG. 2 is a perspective view of the invented device showing an alternate clamp embodiment at another disposition.

2

For the purpose of illustrating the invention, there is shown in the drawing a form which is presently preferred, it being understood, however, that this invention is not limited to the precise arrangements and instrumentalities there shown.

Referring now to the drawings in detail, wherein like numerals indicate like elements, there is shown in FIG. 1 an illustration of the automotive exhaust pipe support of the present invention designated generally at 10. An anchor strap 20, slightly rounded at ends 23, 25, is preferably a stiff and sturdy metal which may be economically fabricated by a process such as stamping. As illustrated, a series of evenly spaced holes 28 are provided throughout the length of the anchor strap 20. A fixed placement of the anchor strap 20 on a vehicle under-frame may be accomplished by means of a conventional fastener, such as a bolt or rivet (not shown), through one or more of the holes 28. Naturally, the placement may be adjusted to a variety of positions by an appropriate choice of the holes 28.

A yoke member 30 is provided by a band 31 of resilient material doubled back so that the band ends 33, 35 are flush with respect to each other, and in this manner forming a loop. The band of resilient material is preferably a rubber having a smooth side 36 and a rough, treaded side 38. When the band 31 is formed into a loop, the smooth side 36 faces outwardly and the treaded side 38 faces inwardly, in the manner illustrated. The yoke member 30 may be appreciably strengthened by reinforcement cords 39, which may be a synthetic, such as nylon or the like, at the interior of the band 31. A multi-ply rubber, similar to that in an automotive tire, has been found to be a very satisfactory material in forming the yoke member 30.

A single conventional rivet 40 fastens the yoke member 30 on the anchor strap 20; however, it is realized, of course, that other conventional fasteners are available for the same purpose. The rivet 40 has a large flat head 43 shown at FIG. 1, and a shaft 45 which passes through the ends 33, 35 of band 31 and also through an opening provided therefor in the end 23 of strap member 20. With reference to FIG. 2, it may be seen that the end of shaft 45, opposite the flat head 43, is expanded in a conventional manner to provide a rivet fastening closing the loop of band 31 and securing the yoke member 30 at one end of the strap member 20. During placement of the rivet 40, pressure is exerted to slightly compress the resilient material of yoke 30, thereby providing a tight fastening which prevents the yoke from being easily pivoted thereabout. In this respect it is to be noted, that the band 31 is doubled back on itself with both ends 33, 35 on one side of the anchor strap 20, as illustrated in the figures, for a dual purpose. First, a greater degree of compression is attained, and such attainment is facilitated by having both ends 33, 35 of the band 31 together. Secondly, since the smooth side 36 faces outwardly, it bears only against the surface at one side of the anchor strap 20 and the somewhat smaller under-surface of the flat head 43. In this manner, compression of the smooth side 36 against one side of the anchor strap 20 is sufficient to maintain the yoke 30 at a particular disposition with respect to the strap 20, however, the yoke member 30 may be forcefully pivoted about the rivet 40 (which also turns therewith) to an alternate disposition, as may be best visualized by comparison of FIGS. 1 and 2. The rivet 40 usually pivots along with the yoke member 30 because of a greater friction co-efficient and larger contact area therebetween as compared to that between shank 45 and anchor strap 20. The rough, treaded side 38 of band 31 faces inwardly, as illustrated, bearing against itself with the treads interlocked at end 33, 35. The frictional resistance of treaded side 38 against itself is much greater than that between smooth side 36 and strap 20. In fact, it is sufficient to maintain the flush alignment of ends 33, 35, while the yoke member 30 is being pivoted to a new position.

A pipe clamp, generally indicated by the numeral 50, may be any one of several standard types of pipe clamps, such as those in the figures, which have a cross member 51 that can be passed through the loop formed by the resilient yoke member 30. As shown, the cross member 51 has an arm portion 52 extending at either side of the yoke member 30 and a recessed mid portion 55 which is securely gripped within the loop by treaded side 38. The mid portion 55 is recessed with respect to the arms 52, and also includes projecting flanges 56, thereby forming a curved channel section thereat. The cross arm 51 is strengthened at the mid portion 55 by the channel section which is curved in a manner to provide enlarged matching surfaces which engage against the treaded inner side 38 of the loop for a secure grip therebetween. Since the loop of yoke member 30 fits between the arms 52 and within the recessed mid portion 55, as shown, displacement between the yoke member 30 and the cross member 51 will be limited. Notice that the several types of pipe clamps also include a U-shaped member 60 which is adapted to pass around an exhaust pipe (not shown) for connection with both arms 52, thereby providing a secure clamp thereabout. With reference to the clamp type of FIG. 1, the U-shaped member 60 is provided by a U-bolt 61 having legs 62, 63. A slot opening 53 is provided in each arm 52 for passage therethrough of the threaded ends of legs 62, 63. The U-bolt 61 also passes through openings provided in a clamp piece 67 which is appropriately shaped to correspond to the configuration of a pipe section. Retaining nuts 64 and lock washers 65 engage the threaded ends of legs 61, 62 and are tightened to draw the U-bolt 61 and clamp piece 67 together for a secure clamping about an exhaust pipe (not shown).

An optional type pipe clamp is shown in FIG. 2, where the U-shaped member 60 is provided by a U-strap 70. In this case, the U-strap 70 has a flat extending leg 71 having a series of spaced pairs of opposed slots 72 therein. The opposite leg 73 extends in a plane nearly perpendicular to that of the slotted leg 71. In this type clamp, an elongated slotted opening 76 is provided at one arm 52 of the cross piece 51 for the reception of the slotted leg 71 which is turned sideways to fit therein. The pairs of slots 72 in the leg 71 will receive portions of the arm 52 upon alignment with a particular pair and a 90° turning of the U-strap 70. It is apparent that an adjustment, corresponding to the size of exhaust pipe, may be accomplished by an appropriate choice of the pairs of slots 72. Also, it is to be noted that although this type clamp does not have a clamp piece 67, the arms 52 have a curved portion 68 which fit the outer configuration of an exhaust pipe. Furthermore, in either type clamp of FIGS. 1 and 2, notice that the yoke member 30 will be contained in position at the recessed mid portion 55 upon a clamping together of the cross members 51 and U-shaped member 60 about an exhaust pipe. A rectangular opening 77 is provided at the opposite arm 52 for the reception of a correspondingly shaped boss at the under surface of a carriage bolt head (not shown). The carriage bolt extends through an opening 78 provided in leg 73 for an engagement with an appropriate retaining nut and lock washer (not shown), which are tightened together for secure clamping of an exhaust pipe between the cross member 51 and U-strap 70.

The automotive exhaust pipe support described above may be universally applied on many different vehicle models at a variety of dispositions with any one of several types of clamps. It will not usually be necessary to bend the anchor strap 20 since a variety of dispositions are available by merely revolving the clamp 50 about the cross member 51 within the loop of yoke member 30, and/or pivoting the entire yoke member 30 about the rivet 40. The resiliency of the yoke member 30 tends to dampen out vibrations, including those in the form of noise and heat, and therefore insulates the anchor strap 20 from the pipe clamp 50. In this manner, the life of the pipe support is extended, promoting a quiet and secure exhaust system.

The present invention may be embodied in other specific forms without departing from the spirit of potential attributes thereof and, accordingly, reference should be made to the appended claims, rather than to the foregoing specification as indicating the scope of the invention.

We claim:

1. A pipe support comprising an anchor strap suitable for a fixed placement thereof; a resilient yoke member provided by a band of resilient material doubled back to form a loop; a single fastener through said strap and ends of said band of material, thereby closing said loop and fastening said yoke to said strap, said single fastener to provide a pivot allowing said yoke to be turned to various dispositions; and a pipe clamp passing through said loop and being held at a desired disposition thereby, said yoke member providing an insulating junction to dampen vibration between said strap and clamp.

2. A pipe support comprising an anchor strap suitable for a fixed placement; a yoke member provided by a band of resilient material doubled back to form a loop, said material being a band of rubber having a smooth side facing outwardly and a rough, treaded side facing inwardly, both with respect to said loop; a single rivet through ends of said band of material and strap, thereby closing said loop and fastening said yoke to said strap; and a pipe clamp held in said yoke member by passing through said loop, said treaded side gripping tightly against said clamp to hold it at a desired disposition, said yoke member providing an insulating junction to dampen vibration between said strap and clamp.

3. A pipe support in accordance with claim 2, wherein said band is doubled back on itself with both ends thereof on one side of said strap for a tight compression thereagainst by said rivet, yet said smooth side facing outwardly against said strap and rivet enabling said loop to be forcefully pivoted about said rivet to a desired disposition which is retained by said compression, while said treaded side bears against itself at both ends of said band to maintain an alignment thereof.

4. A pipe support in accordance with claim 3, wherein said band is of a multi-ply rubber including interior reinforcing cords therethrough, and band being fastened at one end of said strap.

5. A pipe support comprising an anchor strap suitable for a fixed placement thereof; a resilient yoke member fastened on said strap, said yoke member being a band of resilient material doubled back to form a loop; and a pipe clamp held in said yoke member at a desired disposition, said pipe clamp including a cross-member extending through said loop with arms projecting at either side thereof, and a U-shaped member adapted to pass around a pipe for a connection with said arms securely clamping said pipe therein, said yoke member providing an insulating junction to dampen vibration between said strap and clamp.

6. A pipe support in accordance with claim 5, wherein said cross member has a recessed mid-portion between said arms, said loop of said yoke member fitting between said arms within said recessed mid-portion to limit thereby displacement between said yoke member and cross member.

7. A pipe support in accordance with claim 6, wherein said recessed mid-portion includes projecting flanges forming a curved channel section thereat strengthening said cross member and providing matching surfaces engaging against inner surfaces of said loop for a secure grip therebetween.

8. A pipe support comprising an anchor strap suitable for a fixed placement thereof, said anchor strap having a series of spaced openings therethrough for an adjustable placement thereof; a resilient yoke member fastened on said strap; and a pipe clamp held in said yoke member at a desired disposition, said yoke member providing an insulating junction to damped vibration between said strap and clamp.

References Cited by the Examiner

UNITED STATES PATENTS

| | | | |
|---|---|---|---|
| 2,160,808 | 6/1939 | Bradley | 248—54 X |
| 2,288,172 | 6/1942 | Ulrich | 248—54 |
| 2,981,351 | 4/1961 | Knickerbocker et al. | 180—64 |
| 3,161,252 | 12/1964 | Brown | 248—60 X |

CLAUDE A. LE ROY, *Primary Examiner.*